Jan. 12, 1937.  J. D. PENTON  2,067,542
WIND REACTION TURBINE
Filed May 4, 1935  2 Sheets-Sheet 1
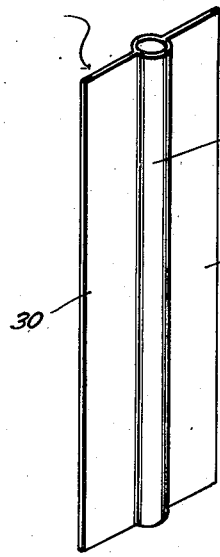
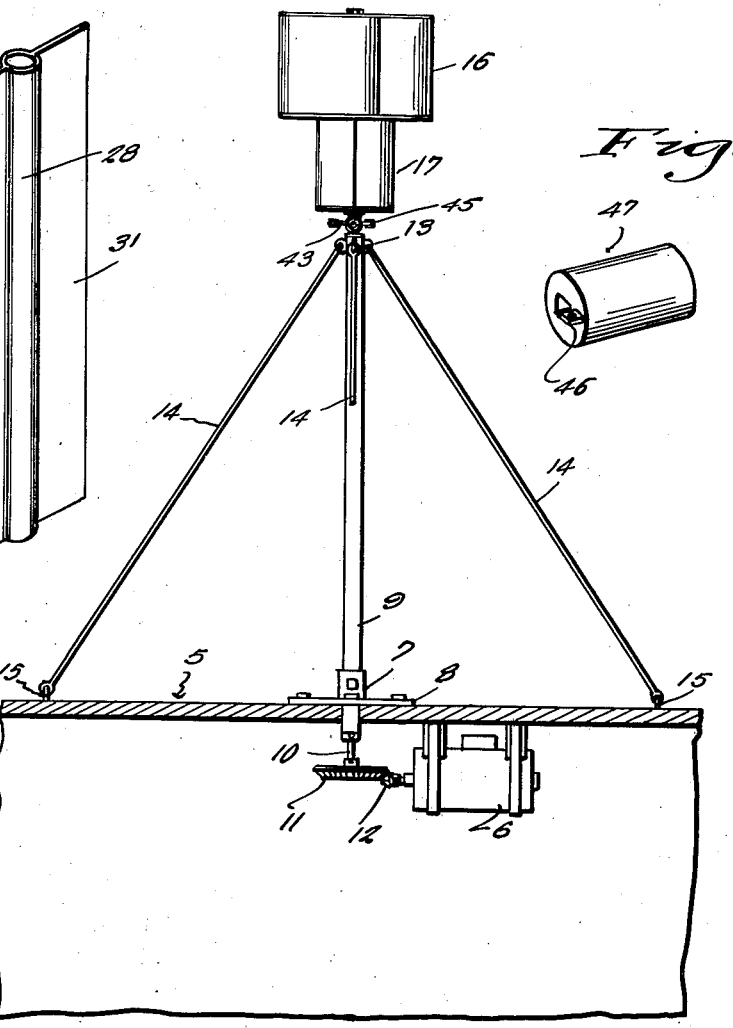
Inventor
J. D. Penton
By Clarence A. O'Brien
Attorney Jan. 12, 1937. J. D. PENTON 2,067,542
WIND REACTION TURBINE
Filed May 4, 1935 2 Sheets-Sheet 2
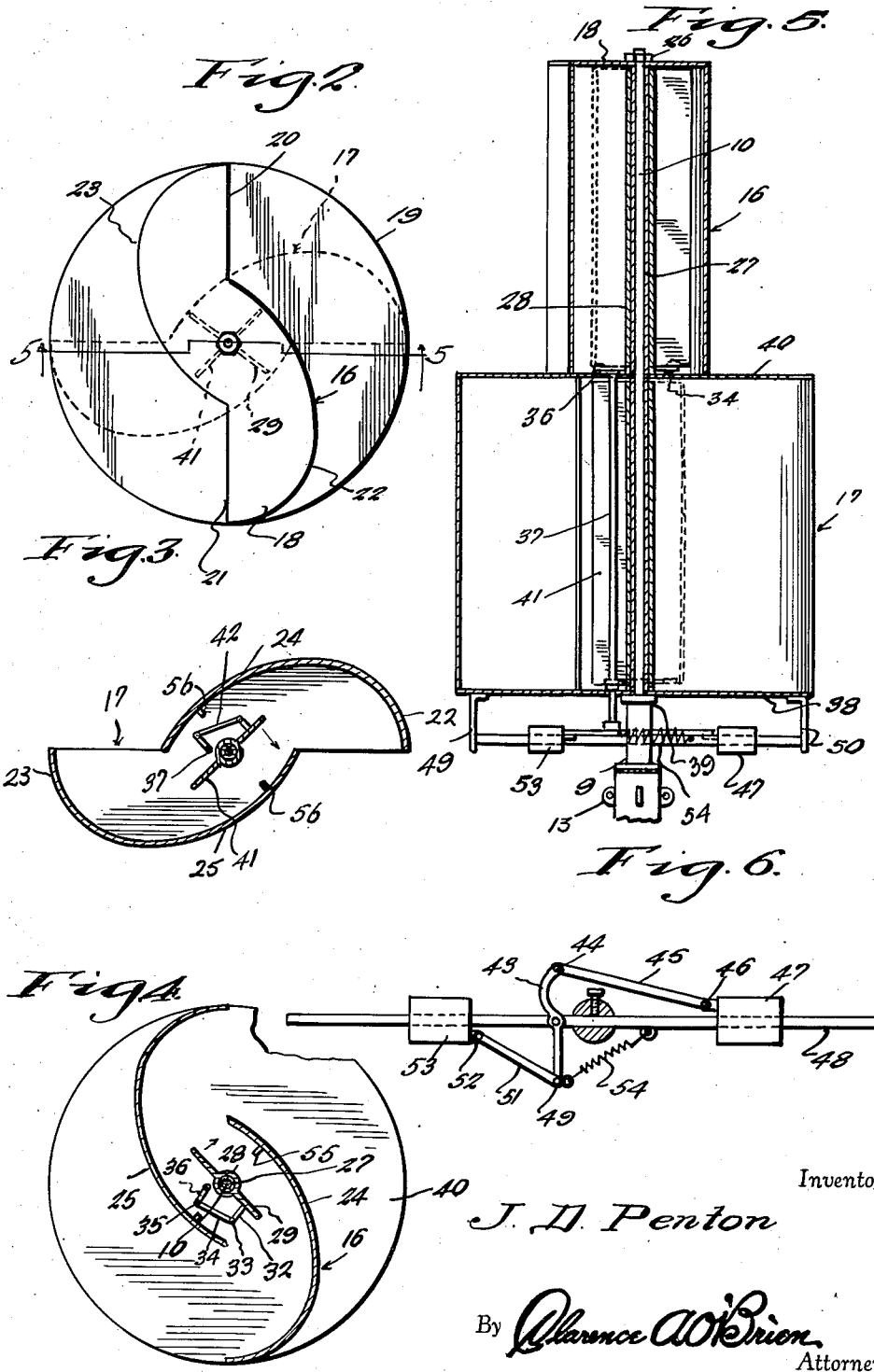
Inventor
J. D. Penton
By Clarence A. O'Brien
Attorney Patented Jan. 12, 1937

2,067,542

UNITED STATES PATENT OFFICE 2,067,542

WIND REACTION TURBINE

Jules Denver Penton, Istrouma, La.

Application May 4, 1935, Serial No. 19,856

1 Claim. (Cl. 170—12)

My invention relates generally to wind driven motors, and particularly to a wind driven turbine of the reaction type, and an important object of the invention is to provide a simple and efficient and structurally wind operated device of this kind which supplies an unusual amount of power for driving machinery such as an electrical generator, considering the size and weight of the device.

Another important object of the invention is to provide in a device of the character indicated above, a governor means which automatically changes the capacity of the wind operated elements whereby to maintain an even predetermined speed in winds of different velocities.

Other important objects of my invention will be apparent from a reading of the following description in connection with the drawings, wherein for purposes of illustration I have shown preferred embodiments of my invention.

In the drawings:—

Figure 1 is a general side elevational view showing an embodiment of the invention in operative relation to an electrical generator.

Figure 2 is a top plan view of Figure 1.

Figure 3 is a horizontal sectional view taken through the lower vanes.

Figure 4 is a horizontal sectional view taken through the lower part of the upper vane and looking downwardly.

Figure 5 is a vertical transverse sectional view taken through Figure 2 approximately on the line 5—5 and looking in the direction of the arrows.

Figure 6 is a horizontal sectional view taken below the lower vane and showing the governor mechanism in top plan.

Figure 7 is a perspective view of one of the governor vanes.

Figure 8 is a perspective view of one of the governor weights.

Referring in detail to the drawings, the numeral 5 generally designates a supporting medium to the lower side of which is mounted an electrical generator 6 or similar machine to be driven by the device of the invention. A sleeve 7 having a mounting flange 8 secured to the upper side of the support 5 is traversed by the lower part of the vertical nonrotatable tube 9 whose lower part does not extend below the support 5. As indicated, the rotary shaft 10 has on its lower end a beveled gear 11 in mesh with a beveled pinion 12 on the generator shaft. The tube 9 in which the shaft 10 works has ears 13 at its upper end which secure the upper ends of a suitable number of guy wires or rods 14 which have their lower ends anchored to the support 5 as indicated at 15 at points radially outwardly spaced from the mounting socket 7 for giving adequate support and alignment to the tube 9.

The wind operated elements of the invention consist of the upper vane assembly 16 and the lower vane assembly 17. Each of these vane assemblies is propeller-shaped in plan as indicated particularly well in Figures 2 and 3. The upper vane assembly 16 has a top wall 18 but no bottom wall, the bottom being closed by the disk 19 which is at least as large in diameter as the largest diameter of either of the vane assemblies, so that the wind effects on the upper and lower vane assemblies are kept separated, and there is no eddy current interference between them.

The upper vane assembly consists of the propeller-shaped top 18 with the diametrically aligned edges 20 and 21 and the circumferentially displaced curved edges 22 and 23. These curved edges 22 and 23 have their inner ends overlapping and extending beyond the center of the vane assembly on opposite sides thereof and joining the radially inward ends of the straight edges 20 and 21.

Corresponding to the curved sides 22 and 23 and coextensive therewith are the opposite cambered walls 24 and 25 as shown in Fig. 3.

The center of the top wall 18 is traversed by the upper end of the shaft 10 as shown in Figure 5 and a nut 26 on the upper end of the shaft holds the upper vane assembly 16 in its place on the shaft, the lower end of the upper vane assembly being suitably fastened to the disk 19 which acts as a top for the lower vane assembly 17. An inner tube 27 immediately surrounding the shaft 10 has revolubly mounted thereon the outer tube 28 of the governor vane 29, so that the governor vane is freely swingable. The form of the governor vane is clearly shown in Figure 7 to consist of the tubular part 28 and the similar diametrically opposed wings 30 and 31. The vane 29 is almost as wide as the space between the radially inward ends of the walls 24 and 25 so that when the vane 29 is turned so as to be approximately normal to the interior surfaces of the radially inward ends of the walls 24 and 25, the vane will completely close the chamber formed by the vanes. As inferred and as clearly shown in Figure 5 the governor vane 29 is of the same vertical height as the interior of the upper vane assembly.

A projection 32 on the lower end of one side of the vane 29 is pivoted as indicated at 33 to a link 34 which is in turn pivoted as indicated at 35 to an arm 36 on the upper end of the governor shaft 37, whereby movement of the governor which is mounted below the lower vane assembly is transmitted to the governor vane 29 in the upper vane assembly.

The lower vane assembly 17 is formed similar to the upper vane assembly except that it is provided with a bottom 38 which rests on and is fastened to a flanged collar 39 on the shaft 10 and secured thereto. Of course the disk 19 forming the top of the lower vane assembly and the bottom 38 are traversed by the governor shaft 37. The lower end of the collar 39 rests on a thrust bearing at the upper end of tube 9, located just under governor slide or guide rod and weights. A governor vane 41 similar to the governor vane 29 is similarly located and arranged in the lower vane assembly and has similar operative connections generally designated 42 with the governor shaft 37.

The governor shaft 37 extends below the bottom 38 of the lower vane assembly and is rigidly connected to the middle portion of a lever 43 pivotally connected as indicated at 44 to the radially inward end of the link 45 which has its radially outward end connected to an ear as indicated at 46 on one side of a sliding weight 47 which is mounted on the weight guiding rod 48 which has end brackets 50 mounting the same in spaced relation to the bottom 38 of the lower vane assembly; and the opposite end of the lever 43 is pivotally connected as indicated by the numeral 49 to the radially inward end of the link 51 which has its radially outward end connected to an ear 52 on the weight 53 which is slidable on the rod 48. A retracting spring 54 is stretched between the pivotal point 49 and the rod 48 between the lever 43 and the weight 47 and is arranged to draw the weights radially inwardly and resist centrifugal movement of the weights.

The upper vane assembly 16 has stops 55 on the opposite side walls 24 and 25 for stopping the governor vane in the extreme position and similar ribs 56 in the lower vane assembly coact with the governor vane 41 in the extreme position thereof.

The wind enters the upper and lower governor assemblies at the straight edge open side thereof and passes around and through the vane assemblies following the curvature of the walls in an unrestricted manner while the governor vanes are in the open position illustrated in Figures 3 and 4. A reaction is produced by the passage of the confined wind on the far part of the vane assemblies just as the wind is leaving, which gives the vane assemblies an extra fillip or reaction which preserves the uniformity of the rotational effect of the wind thereon. When the speed of the vane assemblies becomes abnormal with respect to the predetermined rate, the weights 47 and 53 will move radially outwardly and rotate the governor rod 37 so as to turn the governor vanes 29 and 41 so as to partially or completely close the passage between the chambers defined by the respective scoop portions of the vane assemblies. The restriction of the passage of the wind through the vane assemblies produces in the far scoop a vacuum condition besides the obvious reduction in the "fillip" mentioned; while an almost complete closed position of the governor vanes produces in the following scoops a condition of vacuum which resists the rotation of the vane assemblies which correspondingly slows down the vane assemblies; that is, keeps the vane assemblies from departing too greatly from the rate of speed predetermined. The spring 54 will, upon reduction in the wind pressure, restore the governor vanes to the original fully opened position or to an intermediate position, in accordance with the reduction in the pressure of the wind.

Although I have shown and described herein a preferred embodiment or my invention, it is to be definitely understood that I do not desire to limit the application of the invention thereto, and any change or changes may be made in the materials, and in the structure and arrangement of the parts, within the spirit of the invention and the scope of the subjoined claim.

What is claimed is:—

A reaction wind turbine of the character described comprising a support, a vertical shaft on which said support is rotatably mounted, an upper vane assembly and a lower vane assembly fixedly mounted on said shaft, each vane assembly being formed to provide a transverse distorted wind passage in plan, said vane assemblies being disposed in angular relation with respect to each other, each vane assembly having an interior governor vane of substantially rectangular-shape and being provided with a longitudinally extending centrally disposed sleeve through which the vertical shaft of the vane assembly extends, a governor shaft extending through said sleeve between the vertical shaft and the inner side of the sleeve for rotating said governor vanes, and governor mechanism to which governor shaft is operatively connected.

JULES DENVER PENTON.